United States Patent

Baldwin

[15] 3,639,854
[45] Feb. 1, 1972

[54] ELECTRON BEAM SCANLASER HAVING PHOTOCHROMIC Q-SPOILER

[72] Inventor: William J. Baldwin, West Roxbury, Mass.
[73] Assignee: Corning Glass Works, Corning, N.Y.
[22] Filed: Nov. 22, 1968
[21] Appl. No.: 778,231

[52] U.S. Cl............................................331/94.5, 350/160
[51] Int. Cl..........................................................H01s 3/00
[58] Field of Search............................350/160 P; 331/94.5

[56] References Cited

UNITED STATES PATENTS

| | | | |
|---|---|---|---|
| 3,400,214 | 9/1968 | Hamann | 178/7.87 |
| 3,445,826 | 5/1969 | Myers | 331/94.5 X |
| 3,473,864 | 10/1969 | Garbuny | 331/94.5 X |

*Primary Examiner*—Ronald L. Wibert
*Assistant Examiner*—Edward S. Bauer
*Attorney*—Clarence R. Patty, Jr., Walter S. Zebrowski and William J. Simmons, Jr.

[57] ABSTRACT

An optical system for controlling the direction of lasing action by utilizing photochromic material as a passive Q-switcher in the cavity of an angularly degenerate laser. By controlling the optical density at various points on the photochromic material, the laser can be made to radiate in any desired direction. A cathode-ray tube is used to generate a controllable spot of light, the wavelength of which is such that it changes the optical density of the photochromic material.

18 Claims, 3 Drawing Figures

INVENTOR.
William J. Baldwin
BY
ATTORNEY

ELECTRON BEAM SCANLASER HAVING PHOTOCHROMIC Q-SPOILER

BACKGROUND OF THE INVENTION

This invention relates to steerable lasers. More particularly, it relates to lasers employing multimode optical structures which can be made to produce a plurality of discrete output beams in selected directions.

As used herein, the terms "Q-switching" and "Q-spoiling" are defined as follows. For a laser to generate output, the energy losses from the laser mode must be less than the energy added to the mode from the pumped material. The energy loss from the mode is directly proportional to the stored energy in the mode, so that a measure of laser mode quality or Q is $$Q = \frac{2\pi \text{ energy stored in the mode}}{\text{Energy lost from the mode per cycle of the output frequency.}}$$

By controlling one or more of the energy loss mechanisms the Q can be changed above or below the critical value needed for output generation. This control of laser output by control of the Q is known as Q-switching or Q-spoiling.

Since the development of the laser, many practical applications thereof have remained unrealized due to the difficulty encountered in the attempt to develop an efficient method of scanning a laser beam. Although a number of deflection systems have been developed, none of them are practical enough to be utilized in such systems as optical memories, laser television displays, bright line-drawing displays or the like.

At present, one of the most promising methods for scanning a laser beam is the scanlaser, a device in which the direction of emission of a laser is controlled by an electron beam. Such a device is described in the IEEE Journal of Quantum Electronics, QE-2, page 182, July 1966, in an article entitled "Electron Beam Scanlaser." The heart of the scanlaser is a laser which has an angularly degenerate mode structure, i.e., a laser which is capable of simultaneously operating in many modes, the beam associated with each mode emerging from the laser in a direction unique to that mode. In this prior art scanlaser, one of the laser cavity mirrors is deposited on a KDP crystal (a transparent, birefringent crystal of $KH_2PO_4$) which is located within a cathode ray tube (CRT) adjacent the faceplate thereof. This mirror serves as one end of the laser cavity and also as a target for the CRT electron beam. The other face of the KDP crystal is coated with a transparent layer of conducting CdO and then with an antireflection coating, the CdO serving as an electrical ground. The CRT window is a fused quartz plate, which is strain birefringent.

This scanlaser operates as follows. A uniform birefringence is created in the quartz plate, and the plate's property of inducing elliptical polarization spoils the Q i.e., causes large losses) for all of the degenerate modes, and no lasing occurs. If the electron beam strikes the dielectric mirror deposited on the KDP crystal, a charge is deposited, and an electric field is established between the charge and the CdO ground layer. This field induces a localized birefringence in the KDP crystal because of the longitudinal (i.e., effect. If the orientation of the KDP crystal and quartz plate is such that the slow and fast axes of the KDP crystal are opposite those of the quartz, the net birefringence can be made zero for the laser mode defined by the electron beam position on the KDP crystal, and the laser will oscillate in this mode alone. When the electron beam scans over the KDP crystal, the laser beam will track the electron beam, each electron beam position corresponding to a different laser mode. If the area filled with deposited charge is larger than the single-mode spot size, several modes may oscillate simultaneously. The above-described scanlaser is very slow, has low resolution due to charge diffusion, and its available optical power is low. Due to the decay time of the charge deposited on the KDP crystal, the beam does not turn off quickly after the electron beam has moved to another position. The contrast and resolution are not uniform over the scanned field because the Q is not uniform over the field.

SUMMARY OF THE INVENTION

It is therefore an object of this invention to provide a system for rapidly changing the direction of a laser beam.

Another object of this invention is to provide a high-resolution scanlaser which can be simply and economically constructed.

A further object of this invention is to provide a scanlaser which is capable of generating a changeable, line-scan pattern.

Another object of this invention is to provide a scanlaser which is capable of generating line drawings which can be permanently displayed, erased, or rapidly changed.

A more specific object of this invention is to provide an electron beam scanlaser which utilizes photochromic material as a highly sensitive Q-spoiler.

Briefly, the scanlaser of this invention comprises an active laser element which is capable of operating simultaneously in a plurality of optical modes, the light rays in each of the modes emerging from the laser cavity in a direction unique to that mode. Means are provided for applying pumping energy to the active element of the laser. Photochromic means are disposed within the laser cavity. The photochromic means are characterized in that the optical density at any point thereon can be varied by irradiating the same with specific wavelengths of light, the Q of each possible mode being spoiled by that portion of the photochromic means through which that particular mode would pass when the photochromic means is in its optically dense state. Means are provided for selectively irradiating portions of the photochromic means with light, the wavelength of which is such that the optical density thereof is changed.

Other objects, features, and advantages of this invention will become apparent during the course of the following detailed description and the attached drawings, on which, by way of example, only the preferred embodiments of this invention are illustrated.

DETAILED DESCRIPTION

Figure 1:
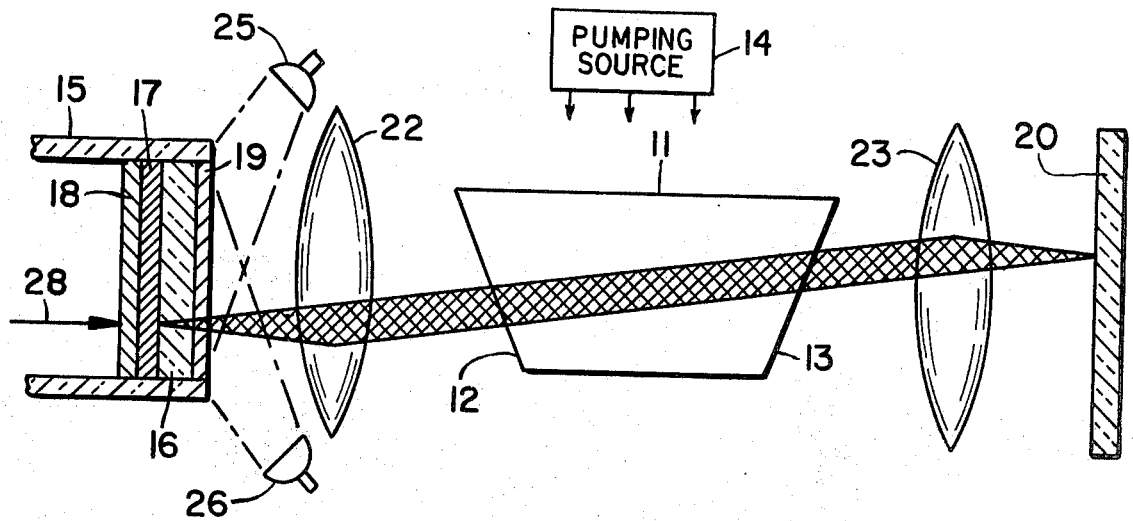
FIG. 1 shows an improved scanlaser which incorporates a layer of photochromic material as the Q-spoiler.

Referring to FIG. 1, there is shown an electron beam scanlaser, the negative temperature medium of which is located within a suitable glass envelope 11 having transparent loss-free output windows 12 and 13 at opposite ends thereof, the output windows being inclined at the Brewster angle with respect to the longitudinal axis of the envelope. A pumping source 14 is illustrated in block diagram form. This source may consist of a radiofrequency source for providing energy to excite an electrical discharge through the negative temperature medium.

Axially aligned with the envelope 11 and disposed a suitable distance from the window 12 is a cathode ray tube, a portion of the envelope of which is shown at 15. The cathode-ray tube faceplate 16 may consist of a homogeneous plate of photochromic material or may consist of a photochromic fiber optic plate such as that described in copending U.S. Pat. application Ser. No. 677,185, filed on Oct. 23, 1967. The cathode-ray tube could also contain a conventional glass faceplate having a photochromic plate adjacent thereto. Immediately adjacent the inner surface of the faceplate is a dichroic mirror 17, the properties of which depend upon the particular mode of operation as will be later described. A layer 18 of phosphor is deposited on the surface of the dichroic mirror 17. The dichroic mirror must transmit at least a portion of the light emitted by the phosphor and reflect light emitted by the laser. An antireflection coating 19 on the external surface of the CRT faceplate improves the coupling between the negative temperature medium and the photochromic material by eliminating reflections at the air-glass interface.

The preferred photochromic material for use in this invention is photochromic glass, the characteristics and production of which are described in U.S. Pat. No. 3,208,860, granted to W. H. Armistead and S. D. Stookey on Sept. 28, 1965. Photochromic glass has the property of becoming less transparent if irradiated with blue or ultraviolet light, remaining uneffected by green light and becoming more transparent if irradiated by red, infrared or orange light. The process by which photochromic glass is made less transparent will be referred to as activation, and the process whereby it is made more transparent will be referred to as bleaching. It is to be noted that after such glass has been activated, if the activating source has been removed, the glass will naturally fade or become bleached, the rate of fading being proportional to the temperature of the glass and the properties of the particular type of photochromic glass.

Although photochromic glass is the preferred photochromic material, the tenebrescent material disclosed in U.S. Pat. No. 3,253,497, issued to J. N. Dreyer could also be used. Such tenebrescent materials include the alkali halides, numerous oxides, sulfides, sulfates, phosphates, nitrates, cyanides, and other inorganic compounds. Furthermore, metachromic films such as those described in U.S. Pat. No. 3,085,469, issued to C. O. Carlson may also be utilized for the photochromic material 16.

The laser cavity is a flat-field conjugate cavity which consists of two plane mirrors, the dichroic mirror 17 and a mirror 20. The mirrors are imaged onto each other by a pair of identical achromatic doublets 22 and 23 which are separated by twice their focal length. This laser is capable of simultaneously radiating in many directions. However, by selectively darkening the photochromic material 16 which is situated within the laser cavity, the laser can be made to radiate in any desired direction. The steerable electron beam 28 selectively excites small areas of the light-emitting phosphor 18, some of the light generated in the phosphor passing through the mirror 17 and either activating or bleaching the photochromic material 16 which is located within the laser cavity. The change in the optical transmission properties of the photochromic material either hinders or assists the lasing action, and the direction of the laser output radiation is thereby controlled. Light sources 25 and 26 flood the photochromic material 16 with bleaching and activating light, respectively. For example, the source 25 may provide red light and the source 26 may provide ultraviolet light. At any given time, one of these sources may be operative to either erase all of the information stored in the photochromic material, or it could be operated at a lower power level to offset the influence of some other light source.

Figure 2:
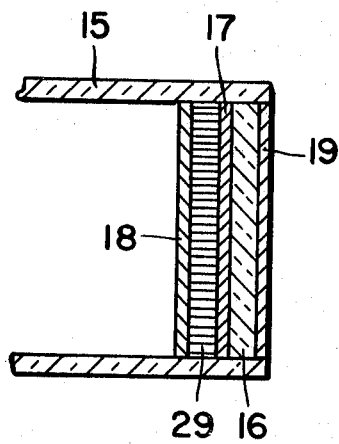
FIG. 2 shows an embodiment wherein a fiber optics plate is introduced into the optical system to enhance the resolution thereof.

In the embodiment shown in FIG. 2 a fiber optics plate 29 is interposed between the phosphor layer 18 and the dichroic mirror 17. Light emitted by the phosphor is relayed by the fiber optics plate 29 and the dichroic mirror 17 to the homogeneous photochromic plate 16. Although the fiber optics plate is essentially a lossy member in the optical system, it collimates the light which is generated by the phosphor, producing smaller spots in the photochromic material, thereby enhancing resolution.

A further advantage of the fiber optics plate 29 is that it separates the delicate dichroic coating 17 from the phosphor 18. The deposition of the phosphor requires a high-temperature baking treatment which may damage the dichroic mirror. There is less chance that the dichroic mirror will be damaged if it is insulated from the phosphor layer by the fiber optics plate 29.

Figure 3:
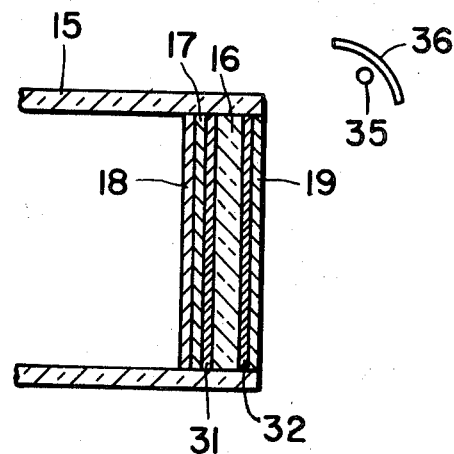
FIG. 3 shows an embodiment which includes two separate means for applying heat energy to the photochromic material.

In FIG. 3, two methods are shown for heating the photochromic material. This method for regulating the optical density of the photochromic material is predicated upon the fact that photochromic glasses exhibit the characteristic that their transparency to visible radiation is dependent upon the temperature of the glass, i.e., the rate of fading of photochromic glass is proportional to the temperature thereof. Thin, transparent electroconductive films 31 and 32 are applied to the inner and outer surfaces respectively of the photochromic material 16. Electrical terminals (not shown) are connected to opposite sides of films 31 and 32. The fading rate, and thus the optical density, of the photochromic material can be altered by adjusting the current flowing through the electroconductive films.

The photochromic material 16 can also be bleached by the application of heat thereto from an external source. In FIG. 3 an infrared source 35 has a reflector 36 associated therewith, the reflector being so disposed as to direct infrared energy onto the photochromic material.

Several modes of operation will be described hereinbelow, each specific mode being dependent upon such variables as the wavelength of light emitted by the phosphor and the laser, the power of the light emitted by the red and the ultraviolet sources 25 and 26, respectively, and the particular type of photochromic material utilized, i.e., the sensitivity thereof to the various wavelengths of light generated by the above-mentioned sources.

MODE A STEERABLE PULSED OPERATION

In this mode of operation the laser emits short pulses of light in the blue region of the spectrum, this region being a portion of the activation spectrum of the photochromic material 16. The direction of these pulses is determined by the position at which the electron beam 28 impinges on the phosphor-coated faceplate of the cathode ray tube, the phosphor being one which emits red light for this mode of operation. The dichroic mirror reflects blue light and transmits red light.

The theory of operation of the steerable pulsed mode is as follows. The photochromic material 16 is maintained in an activated or optically dense state by radiation from either the external source 26 or by the natural fluorescence of the lasing material. In this particular mode of operation, the laser will lase and fluoresce in the blue region of the spectrum. In its darkened state the photochromic material 16 acts as a Q-spoiler, thereby preventing lasing action from taking place. If the photochromic material is made transparent in some small region, then lasing action can take place in the direction governed by the location of the transparent area on the photochromic material and the geometries of the doublets 22 and 23 and the mirrors 17 and 20. The bleaching of the required transparent area is accomplished by exciting the red phosphor with the electron beam 28. The mirror 17 strongly reflects the lasting wavelengths, but freely transmits the bleaching wavelengths from the phosphor. Hence, the electron beam in the cathode-ray tube produces in the phosphor a small bright spot of bleaching radiation which is transmitted by the dichroic mirror to bleach a small spot in the photochromic material. Bleaching any portion of the photochromic material permits lasing to begin. The mode is automatically selected to utilize the bleached spots in the photochromic material. However, since the laser radiates in the activation spectrum of the photochromic material, that material is redarkened by the laser radiation and the laser extinguishes itself. The light output from the laser is therefore a pulse of light in the blue region of the spectrum, the length of which depends on (1) the amount of bleaching in the photochromic material produced by the red phosphor, (2) the darkening sensitivity of the photochromic material at the lasing wavelength, (3) the amount of activating light power on the photochromic material from the lasing action, the natural fluorescence of the lasing material and the external source 26, and (4) the temperature of the photochromic material. The direction of the output light pulse depends on the particular location that the electron beam strikes the phosphor.

MODE B STEERABLE TRACE OPERATION

In this mode of operation the laser continuously scans a beam of activating energy following the electron beam. The apparatus required for this mode of operation is the same as that required for mode A described above, the difference being that for the steerable trace mode, the electron beam stays on continuously. If the electron beam is permitted to remain at one spot, the laser will remain lasing at a level such that the rate of optical bleaching equals the (5) of activation induced by the lasing action, the natural fluorescence of the lasing material, and the external source 26. If the electron beam is scanned, the bleaching in the photochromic material will cause the laser to follow the electron beam. The upper limit of the scanning speed will depend upon (1) the light power output from the phosphor, (2) the sensitivity of the photochromic material to bleaching, (3) the temperature of the photochromic material, (4) the power in the bleaching spectrum from the external source 25, and (5the strength of the natural fluorescence from the lasing material.

By increasing the amount of red phosphor bleaching given each resolution element on the photochromic material the length of the output trace can be varied. Thus, rather than generating a dot of light as in mode A, a scanning line trace can be produced. This will depend on the light power output from the phosphor and the length of exposure time given the resolution element. The line trace can also be controlled by selecting a photochromic material having the proper activation sensitivity at the lasing wavelength, and by controlling the power of the external bleaching and activating sources 25 and 26, respectively. It is to be noted that generally only one of the sources 25 and 26 will be on at any given time since they have opposite effects on the optical density of the photochromic material.

MODE C LINE-DRAWING OPERATION

The laser generates bright lines against a dark background in this mode of operation. A laser, the light output of which is in the red portion of the spectrum is utilized for this mode, and the phosphor 18 also emits a red light. The mirror 17 transmits a portion of red light which is generated by the phosphor and reflects a portion of the light generated by the laser. The laser presentation follows the bleaching spot produced by the phosphor as described above, but in accordance with the present mode of operation, the lines produced in the photochromic plate 16 are permanent.

The theory of operation in the line-drawing mode is as follows. The photochromic material is initially maintained in the darkened state by light from the external source 26. The electron beam 28 excites the phosphor 18 which radiates light, a portion of which is transmitted by the dichroic mirror 17 and bleaches the photochromic material, thereby permitting lasing action to begin. As the lasing action begins, red light therefrom impinges on the photochromic plate 16 and completes the bleaching action. The laser is now permanently on in the bleached area since the external activating source 26 is not strong enough to overcome the strong bleaching effect of the laser. Hence, by scanning the electron beam across the phosphor layer a permanent line drawing is generated with assistance from the laser light output. Any of the following steps can be taken to erase the presentation stored in the photochromic medium. The driving power to the lasing medium can be turned off. The photochromic medium can be flooded with activating energy from the external source 26. A lasing medium which lases either in the red or the blue portions of the spectrum could be used. Through the use of an external color-changing device in the laser, the mode of operation can be changed so that the blue light generated thereby activates the photochromic material, thereby extinguishing the presentation therein. A further method of erasing is to use some device in the laser cavity which quenches the lasting action while the external source 26 darkens the photochromic material.

A variation of this mode of operation is to continuously utilize the source 26 which is operated at a power level which is high enough to activate the photochromic material and overcome the bleaching action of the laser. In this manner traces similar to those described with respect to the steerable trace mode of operation can be generated. The length of these traces will be determined by the relative strengths of the sources 25 and 26, the temperature of the photochromic material, and the relative sensitivity of the photochromic material to the activation and bleaching sources.

Another method of operating in the line-drawing mode utilized a lasting wavelength which has no effect on the optical density of the photochromic material. When the photochromic material is bleached, it will remain at the same transmission state regardless of the laser power incident thereon. Once the lasing action has been started by bleaching a spot through the photochromic material, only the following factors may cause an increase in transmission at that spot. The photochromic material may naturally fade, or it may be thermally bleached. Also, the external source 25 may be utilized to bleach the photochromic means. It is noted that in this mode of operation, the fluorescence of the lasting medium may have an activating effect, in which case its effect must be overcome by one of the previously described methods.

MODE D DARK-TRACE SCANNING

In this mode the laser generates dark line traces against a light background. The lasing color may be either red or a color such as green which does not affect the optical density of the photochromic material. The phosphor 18 must be one which radiates in the blue or ultraviolet region of the spectrum, and the mirror 17 must transmit this ultraviolet light while reflecting, the wavelength of light emitted by the laser.

The photochromic material is maintained in a normally transparent condition by either strong bleaching radiation from the source 25, a high natural fading rate of color centers in the photochromic material, a source of heat (see FIG. 3), or the bleaching action of the fluorescence of the lasing medium and the lasing wavelength. Since the photochromic material is transparent, the laser tends to lase in all allowable modes and directions. The lasing action can be quenched in a given direction by local darkening of the photochromic material. This is accomplished by electron beam excitation of the phosphor, the light output of which tends to darken the photochromic material. Hence, dark lines can be generated on a light background. The pattern may be erased by the bleaching source 25, natural fading, application of heat, or bleaching of the darkened areas by the lasing wavelength via scattering within the photochromic material.

MODE E GRAY-SCALE PRESENTATION

In this mode the laser generates TV-like pictures with gray-scale information. The theory of operation is similar to that set forth with respect to modes C and D, but in this mode the electron beam is modulated in intensity. A gray-scale presentation of low contrast is generated in the photochromic material by the cathode-ray tube. This pattern is amplified by the laser to form a high-contrast presentation which can be projected or relayed by an optical system. The cathode-ray tube can either darken or bleach the photochromic material in this mode of operation. The lasing wavelength can be in any region of the optical spectrum. If it is a region in which the photochromic glass is not affected by the lasing wavelength, the resulting presentation will be permanent. Otherwise, the light generated by the laser, the phosphor, and the sources 25 and 26 will interact on the photochromic material as has been described hereinabove.

Numerous modifications and departures can be made from the specific embodiments described herein without departing from the scope of this invention. The cathode-ray tube could be replaced by other known means for directing a small spot of light onto a plate of photochromic material to vary the optical density thereof. Furthermore, a first scanlaser could be cascaded with a second scanlaser, the first scanlaser being utilized for controlling the optical density of the photochromic Q-spoiler in the second scanlaser.

I claim:

1. A scanlaser comprising
   an active laser element which is capable of operating simultaneously in a plurality of optical modes, light rays in each of said modes emerging from said laser element in a direction unique to that mode,
   means for applying pumping energy to said active element,
   photochromic means disposed within the cavity of said laser, said photochromic means being characterized in that the optical density at any point thereon can be varied by irradiating the same with specific wavelengths of light, the Q of each possible mode being spoiled by that portion of said photochromic means through which that particular mode would pass when the photochromic means is in its optically dense state,
   a cathode-ray tube, said photochromic means being a part of the faceplate of said cathode-ray tube,
   means including a layer of phosphor disposed within said cathode-ray tube to selectively irradiate portions of said photochromic means with light, the wavelength of which is such that the optical density thereof is changed, and
   dichroic mirror means disposed within said cathode-ray tube between said layer of phosphor and said photochromic means, said dichroic mirror means reflecting at least a portion of the light generated by said laser and transmitting at least a portion of the light generated by said phosphor.

2. A scanlaser in accordance with claim 1 wherein said photochromic means consists of a photochromic glass plate, said plate being the faceplate of said cathode-ray tube.

3. A scanlaser in accordance with claim 2 which further includes a fiber optics plate disposed between said phosphor layer and said dichroic means.

4. A scanlaser in accordance with claim 1 wherein said photochromic means consists of a photochromic fiber optic plate, said plate being the faceplate of said cathode-ray tube.

5. A scanlaser in accordance with claim 1 which further includes means for applying heat to said photochromic means.

6. A scanlaser in accordance with claim 5 wherein said means for heating consists of a source of infrared energy, said source being directed toward said photochromic means.

7. A scanlaser in accordance with claim 5 wherein said means for heating consists of a transparent resistive coating disposed on said photochromic means.

8. A scanlaser in accordance with claim 1 which further includes first light source means for flooding said photochromic means with light, the wavelength of which is such that it tends to activate said photochromic means, and second light source means for flooding said photochromic means with light, the wavelength of which is such that it tends to bleach said photochromic means.

9. A scanlaser in accordance with claim 1 wherein said phosphor emits light the wavelength of which is such that it tends to bleach said photochromic glass and said laser emits light the wavelength of which is such that it tends to activate said photochromic glass, said cathode-ray tube being energized intermittently so that pulses of bleaching light are produced by said phosphor, the light from said laser activating said photochromic material after the cessation of bleaching light from said phosphor.

10. A scanlaser in accordance with claim 1 wherein said phosphor emits light, the wavelength of which is such that it tends to bleach said photochromic material and said laser emits light, the wavelength of which is such that it tends to activate said photochromic material said cathode-ray tube being energized so that a spot of light is continually generated on the faceplate thereof, whereby a steerable trace is generated.

11. A scanlaser in accordance with claim 1 wherein both said phosphor and said laser produce light, the wavelength of which is such that it tends to bleach said photochromic means, whereby a permanent trace is generated.

12. A scanlaser in accordance with claim 1 wherein said phosphor generates light, the wavelength of which is such that it tends to bleach said photochromic means and said laser produces light, the wavelength of which is such that it has no effect on the optical density of said photochromic means whereby a line drawing is generated on said photochromic means.

13. A scanlaser in accordance with claim 1 wherein said phosphor generates light, the wavelength of which tends to darken said photochromic means and said laser generates light, the wavelength of which is such that it tends to bleach said photochromic means, whereby a dark-trace scan is generated.

14. A scanlaser in accordance with claim 1 which further includes
   a partially transmitting mirror axially disposed with respect to said active laser element so that said partially transmitting mirror and said dichroic mirror means define the optical cavity of said laser,
   a first achromatic doublet disposed between said dichroic mirror means and said active laser element for imaging light generated by said laser element onto said dichroic mirror means, and
   a second achromatic doublet disposed between said active laser element and said partially transmitting mirror for imaging light generated by said laser onto said partially transmitting mirror.

15. A scanlaser in accordance with claim 14 wherein said first and second achromatic doublets are identical and are separated by a distance which is equal to twice the focal length thereof.

16. A scanlaser in accordance with claim 15 which further includes an antireflection coating on the external surface of said photochromic glass plate.

17. A laser device comprising
   means forming an optical cavity resonator, said resonator being resonant for a plurality of optical modes, light rays in each of said modes emerging from said resonator in a direction unique to that mode,
   means for abstracting light wave energy from said resonator,
   an active medium within said resonator,
   means for pumping said medium to produce a population inversion among the energy levels thereof,
   photochromic means disposed on one reflecting surface of said cavity, said photochromic means being characterized in that the optical density at any point thereon is increased if irradiated with blue or ultraviolet light, is decreased if irradiated with red, infrared or orange light and remains substantially constant if irradiated with green light, the Q of each possible mode being spoiled by that portion of said photochromic means through which that particular mode would pass when that portion of said photochromic means is in its optically dense state, and
   light generating means to selectively irradiate said portion of photochromic means with light, the wavelength of which is such that the optical density thereof is changed, said active medium within said optical cavity being such as to emit light having a wavelength which functions to maintain the optical density of said photochromic means in its changed state.

18. A laser device comprising
   means forming an optical cavity resonator, said resonator being resonant for a plurality of optical modes, light rays in each of said modes emerging from said resonator in a direction unique to that mode,
   means for abstracting light wave energy from said resonator,
   an active medium within said resonator,
   means for pumping said medium to produce a population inversion among the energy levels thereof,
   photochromic means disposed on one reflecting surface of said cavity, said photochromic means being characterized in that the optical density at any point thereon is increased if irradiated with blue or ultraviolet light, is decreased if irradiated with red, infrared or orange light and remains substantially constant if irradiated with green light, the Q of each possible mode being spoiled by that portion of said photochromic means through which that particular mode would pass when that portion of said photochromic means is in its optically dense state, and light generating means to selectively irradiate said portion of photochromic means with light, the wavelength of which is such that the optical density thereof is changed, said active medium within said optical cavity being such as to emit light having a wavelength which functions to reverse the effect of said light generating means on said photochromic means.

* * * * *